United States Patent
Alghamdi et al.

(10) Patent No.: US 12,407,709 B2
(45) Date of Patent: Sep. 2, 2025

(54) METHOD FOR ASSURANCE AND MONITORING OF CONTINUOUS ACTIVE SECURITY DATA AVAILABILITY

(71) Applicant: SAUDI ARABIAN OIL COMPANY, Dhahran (SA)

(72) Inventors: Saleh Mohammed Alghamdi, Dhahran (SA); Hussam Hamoud Alotaibi, Khobar (SA); Faisal Abdulaziz Almansour, Dammam (SA); Amjad Almuzayen, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 385 days.

(21) Appl. No.: 18/058,582

(22) Filed: Nov. 23, 2022

(65) Prior Publication Data

US 2024/0171601 A1    May 23, 2024

(51) Int. Cl.
*H04L 9/40*    (2022.01)

(52) U.S. Cl.
CPC ...... *H04L 63/1433* (2013.01); *H04L 63/1425* (2013.01)

(58) Field of Classification Search
CPC .......... H04L 63/1433; H04L 63/1425
(Continued)

(56) References Cited

U.S. PATENT DOCUMENTS

| | | | |
|---|---|---|---|
| 810,849 A | 1/1906 | Egger | |
| 7,366,768 B2 * | 4/2008 | Deo | H04L 41/5054 709/200 |

(Continued)

FOREIGN PATENT DOCUMENTS

| | | |
|---|---|---|
| CN | 1445670 A | 10/2003 |
| CN | 107273272 A | 10/2017 |

(Continued)

OTHER PUBLICATIONS

P. Z. Kolano, "A Scalable Aural-Visual Environment for Security Event Monitoring, Analysis, and Response*", Proc. of the 3rd Intl. Symp. on Visual Computing, Lake Tahoe, CA; Nov. 26-28, 2007; pp. 1-12 (12 pages).

(Continued)

*Primary Examiner* — Dant B Shaifer Harriman
(74) *Attorney, Agent, or Firm* — Osha Bergman Watanabe & Burton LLP

(57) ABSTRACT

A method and a system for assurance and monitoring of availability of continuous active data security of infrastructure, endpoints, and other organization aspects. The method includes obtaining cybersecurity data from a data repository and configuration data from a configuration management database and generating a list of a plurality of commissioned and decommissioned network elements. Further, it is determined whether each network element from a plurality of network elements is an active network element and the configuration management database is updated with information on the plurality of the commissioned network elements, information on the plurality of the decommissioned network elements, and information on a plurality of active network elements. Additionally, the method includes determining whether each of the plurality of the active network elements satisfies an activity requirement of its activity group, and generating an alert for each of the plurality of the active network elements not satisfying the activity requirement.

20 Claims, 5 Drawing Sheets

(58) Field of Classification Search
USPC .......................................................... 726/25
See application file for complete search history.

(56) References Cited

U.S. PATENT DOCUMENTS

| | | | | |
|---|---|---|---|---|
| 7,788,366 | B2* | 8/2010 | Yacoby | H04L 43/0817 |
| | | | | 709/224 |
| 9,003,010 | B1* | 4/2015 | Saparoff | G06F 21/50 |
| | | | | 709/224 |
| 9,117,447 | B2* | 8/2015 | Gruber | G10L 15/1815 |
| 9,167,372 | B2* | 10/2015 | Pollakowski | H04L 41/0856 |
| 9,350,567 | B2* | 5/2016 | Dinger | H04L 12/6418 |
| 10,057,234 | B1* | 8/2018 | Murchison | H04L 63/145 |
| 10,673,689 | B2* | 6/2020 | Abdulghani | H04L 41/22 |
| 11,075,819 | B2* | 7/2021 | Connelly | H04L 63/1433 |
| 11,290,327 | B1* | 3/2022 | Ramanathan | H04L 43/0817 |
| 2002/0143929 | A1* | 10/2002 | Maltz | H04L 41/12 |
| | | | | 709/224 |
| 2003/0195892 | A1* | 10/2003 | Dhanda | H04L 41/0213 |
| 2005/0157654 | A1* | 7/2005 | Farrell | H04L 41/046 |
| | | | | 709/224 |
| 2010/0094977 | A1* | 4/2010 | Velupillai | H04L 41/0681 |
| | | | | 709/220 |
| 2010/0179940 | A1 | 7/2010 | Gilder et al. | |
| 2010/0195509 | A1* | 8/2010 | Davis | H04L 43/12 |
| | | | | 370/250 |
| 2012/0072480 | A1 | 3/2012 | Hays et al. | |
| 2014/0342721 | A1* | 11/2014 | Pollakowski | H04W 4/50 |
| | | | | 455/418 |
| 2016/0065444 | A1* | 3/2016 | Schunder | H04W 24/04 |
| | | | | 370/252 |
| 2017/0230245 | A1* | 8/2017 | Jacquin | H04L 41/28 |
| 2018/0309788 | A1* | 10/2018 | Johnson | H04L 63/10 |
| 2019/0253315 | A1* | 8/2019 | Velupillai | H04L 41/0803 |
| 2020/0344057 | A1* | 10/2020 | Maria | H04L 9/50 |
| 2020/0412764 | A1* | 12/2020 | May | H04L 41/0853 |
| 2022/0028235 | A1 | 1/2022 | Saldin et al. | |
| 2022/0038486 | A1* | 2/2022 | Baragaba | H04L 63/083 |
| 2024/0171601 | A1* | 5/2024 | Alghamdi | H04L 63/1425 |

FOREIGN PATENT DOCUMENTS

| | | |
|---|---|---|
| CN | 113393354 A | 9/2021 |
| CN | 113691404 A | 11/2021 |
| EP | 0844615 A2 | 5/1998 |
| EP | 2177010 B1 | 10/2015 |
| KR | 20190036078 A | 4/2019 |
| WO | 2017058042 A1 | 4/2017 |
| WO | 2022026828 A1 | 2/2022 |

OTHER PUBLICATIONS

A. Sivanathan et al.; "Classifying IoT Devices in Smart Environments Using Network Traffic Characteristics", IEEE Transactions on Mobile Computing; vol. 18; No. 8; Aug. 2019; pp. 1745-1759 (15 pages).

J. Yang et al.; "Eden: Supporting Home Network Management Through Interactive Visual Tools", UIST '10: Proceedings of the 23rd annual ACM symposium on User interface software and technology; Oct. 2010; pp. 109-118 (10 pages).

A. Lavrenovs et al.; "Towards Classifyting Devices on the Internet Using Artificial Intelligence", 2020 12th International Conference on Cyber Conflict; 2020; pp. 309-325 (17 pages).

Office Action issued by Saudi Arabian patent office for corresponding Saudi Arabian patent application No. 123450871, mailed Jan. 20, 2025 (9 pages).

* cited by examiner

METHOD FOR ASSURANCE AND MONITORING OF CONTINUOUS ACTIVE SECURITY DATA AVAILABILITY

BACKGROUND

Cybersecurity may include the protection of an organization's data or/and infrastructure from both outside threats as well as individuals within an organization that may compromise the data, cause denial of service or other sort of attacks. Quantifying these threats, preventing them and responding to them if occurred as part of an overall risk management is an important aspect to identifying an organization's cybersecurity state. Accordingly, it is commonly needed among many organizations to continuously benchmark their cybersecurity state against an international or customized standard or framework to identify how mature their cybersecurity state is, how much they are in compliant with recommended practices and where the areas of improvements are.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method. The method includes obtaining cybersecurity data from a data repository and configuration data from a configuration management database and generating a list of a plurality of commissioned network elements and a plurality of decommissioned network elements based on the configuration data. Further, it is determined whether each network element from a plurality of network elements is an active network element based on the generated lists and the configuration management database is updated with information on the plurality of the commissioned network elements, information on the plurality of the decommissioned network elements, and information on a plurality of active network elements. Additionally, the method includes determining whether each of the plurality of the active network elements satisfies an activity requirement of its activity group based on the activity of the plurality of the active network elements, and generating an alert for each of the plurality of the active network elements not satisfying the activity requirement based on the activity of the plurality of the active network elements.

In general, in one aspect, embodiments disclosed herein relate to a system including a network comprising a plurality of network elements, a hardware probe coupled to the plurality of network elements, and a computer processor, wherein the computer processor is coupled to the hardware probe, the software probe, and the plurality of network elements. Further, the computer processor comprises functionality for obtaining cybersecurity data from a data repository and configuration data from a configuration management database and generating a list of a plurality of commissioned network elements and a plurality of decommissioned network elements based on the configuration data. Further, the computer processor determines whether each network element from the plurality of network elements is an active network element based on the generated lists and updates the configuration management database, based on the determination, with information on the plurality of the commissioned network elements, information on the plurality of the decommissioned network elements, and information on a plurality of active network elements. Additionally, the computer processor determines whether each of the plurality of the active network elements satisfies an activity requirement of its activity group based on the activity of the plurality of the active network elements and generates an alert for each of the plurality of the active network elements not satisfying the activity requirement based on the activity of the plurality of the active network elements.

In general, in one aspect, embodiments disclosed herein relate to a non-transitory computer readable medium storing a set of instructions executable by a computer processor, the set of instructions including the functionality for obtaining cybersecurity data from a data repository and configuration data from a configuration management database and generating a list of a plurality of commissioned network elements and a plurality of decommissioned network elements based on the configuration data. Further, it is determined whether each network element from a plurality of network elements is an active network element based on the generated lists and the configuration management database is updated with information on the plurality of the commissioned network elements, information on the plurality of the decommissioned network elements, and information on a plurality of active network elements. Additionally, the method includes determining whether each of the plurality of the active network elements satisfies an activity requirement of its activity group based on the activity of the plurality of the active network elements, and generating an alert for each of the plurality of the active network elements not satisfying the activity requirement based on the activity of the plurality of the active network elements.

Other aspects and advantages of the claimed subject matter will be apparent from the following description and the appended claims.

BRIEF DESCRIPTION OF DRAWINGS

Specific embodiments disclosed herein will now be described in detail with reference to the accompanying figures. Like elements in the various figures are denoted by like reference numerals for consistency. Like elements may not be labeled in all figures for the sake of simplicity.

DETAILED DESCRIPTION

Figure 1:
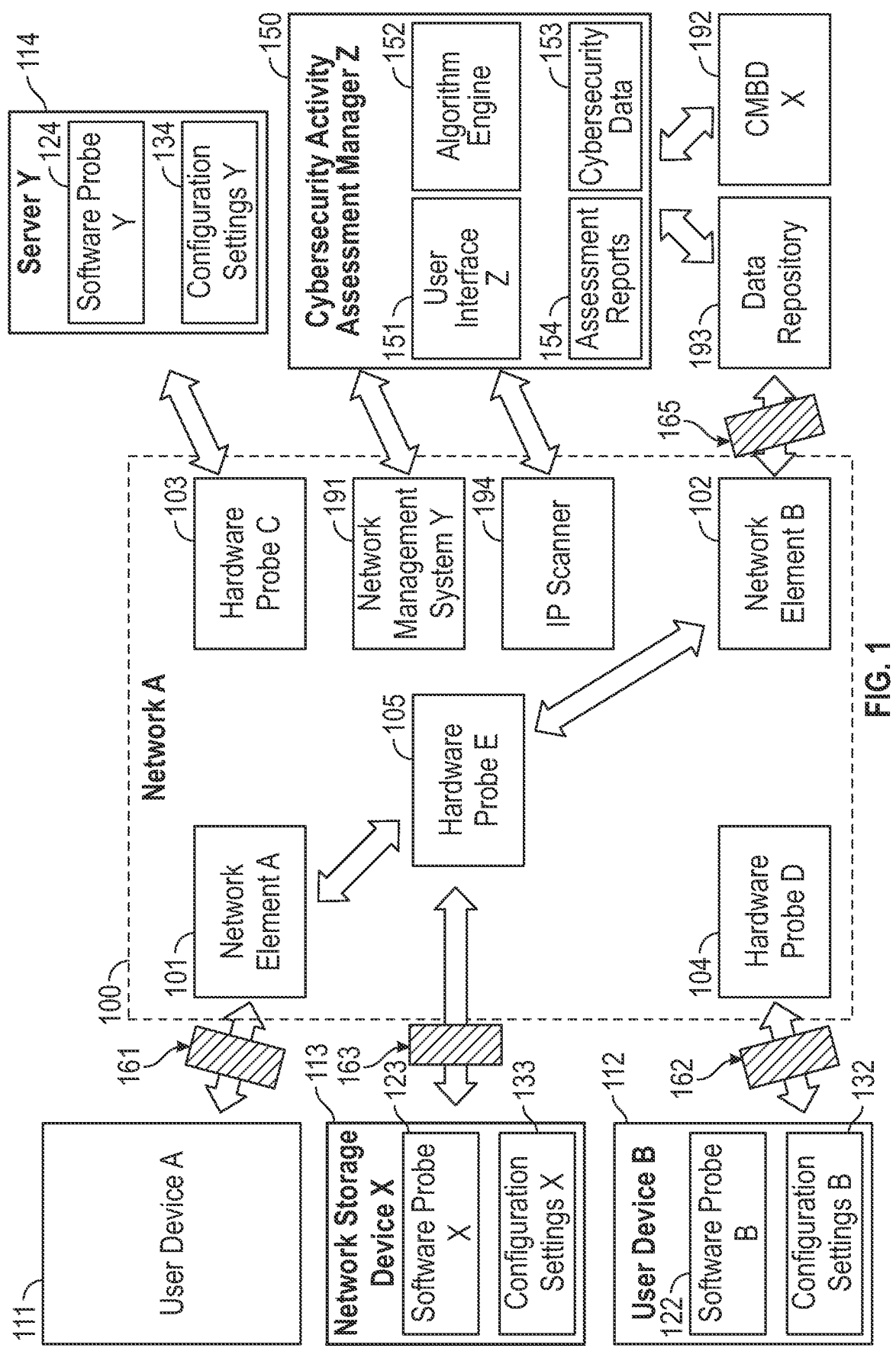
FIG. 1 shows a system in accordance with one or more embodiments.

In the following detailed description of embodiments disclosed herein, numerous specific details are set forth in order to provide a more thorough understanding disclosed herein. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-7, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments disclosed herein provide a method and system for assurance and monitoring of availability of continuous active data security of infrastructure, endpoints, and other organization aspects. The infrastructure may include communication infrastructure (such as cellular wireless network links or leased lines or satellite links), network infrastructure (such as switches, routers and links between them), computing infrastructure (such as servers and storage devices that include premise-based or cloud-based devices), and/or cybersecurity infrastructure (such as Firewalls, IDS, IPS, etc.). The endpoints may include user devices (e.g., PCs, mobile devices) or peripherals. Other organization aspects may include the availability of approved cybersecurity strategies, policies, procedures and workforce certifications. For brevity, "infrastructure and endpoints" (or "network or organization") may be used hereinafter to imply the holistic scope mentioned above.

Furthermore, the method of embodiments disclosed herein monitors the activity of the infrastructure and endpoints and generates the report of the missing data sources or specific events that may be critical for the cybersecurity of the entire network. To perform a cybersecurity monitoring and assurance, multiple hardware probes and multiple software probes may be disposed around a network in order to collect data for analyzing cybersecurity risks as well as detect changes to the cybersecurity state of the network. For example, hardware probes may monitor inline network traffic as the data passes through particular nodes along a network path. On the other hand, software probes may be installed on various network elements to monitor configuration settings and other system data in order to provide a security picture of the infrastructure system or endpoints in a network. More specifically, a cybersecurity assessment may use one or more activity assessment models that provide a metric for analyzing specific cybersecurity areas of an organization as well as for determining an overall cybersecurity picture of the organization against one or more cybersecurity standards or frameworks.

One or more embodiments include a cybersecurity activity assessment manager that provides an autonomous process that determines cybersecurity activity scores and compliance with security standards. More specifically, where a cybersecurity activity assessment is conducted manually by using a human assessor, a cybersecurity activity assessment manager may provide a hardware and/or software implementation on a network that reduces the amount of human subjectivity involved in assessments. Where a human assessor may sample a small selection of evidence to evaluate cybersecurity risks, a cybersecurity activity assessment manager may obtain a complete and accurate picture of a network or organization using multiple probes. Because a human assessor's determination may be dependent on an assessor's judgment, the cybersecurity activity assessment manager may provide a repeatable objective assessment that eliminates human intervention through autonomous processes. Accordingly, a cybersecurity activity assessment manager may assess activity of cybersecurity data through extensive data collection and consistent application of activity metrics.

Further, embodiments disclosed herein allow for an increasing scale of coverage of the cybersecurity data availability and reducing the impact of the human element regarding the investigation and troubleshooting of the cybersecurity dataflow over the network. Further, this disclosure improves the data enrichment required for insights or cybersecurity threat hunting and additionally reduces the false positive rate of failed security data ingestion.

Turning to FIG. 1, FIG. 1 shows a schematic diagram in accordance with one or more embodiments. As shown in FIG. 1, a network (e.g., network (100)) may be coupled to various user devices (e.g., user device A (111), user device B (112)), one or more servers (e.g., server Y (114)), a network storage device (e.g., network storage device X (113)), various network elements (e.g., network element A (101), network element B (102)). A network element may refer to various hardware components within a network, such as switches, routers, and hubs, as well as user devices, servers, network storage devices, user equipment, or any other logical entities for uniting one or more physical devices on the network. User devices may include personal computers, smartphones, human machine interfaces, and any other devices coupled to a network that obtain inputs from one or more users. In some embodiments, a network includes a cybersecurity activity assessment manager (e.g., cybersecurity activity assessment manager Z (150)). The cybersecurity activity assessment manager Z (150) includes hardware and/or software that includes functionality for determining cybersecurity risks and/or remediating the cybersecurity risks, such as restarting network devices, performing connection tests, and implementing security protocols, etc. In some embodiments, a cybersecurity activity assessment manager, network elements, user equipment, user devices, servers, and/or a network storage device may be computing systems similar to the computing system (500) described in FIG. 5, and the accompanying description.

In some embodiments, a network includes a log system that obtains cybersecurity data using hardware probes (103-105), software probes (122-124), IP scanner (194), and the network management system (191). The log system obtains data from operating systems, firewalls, proxy, routers, modems, etc. These data sources are the sources from which cybersecurity data discussed herein is monitored/collected. As such, network includes one or more hardware probes (e.g., hardware probe C (103), hardware probe D (104), hardware probe E (105)). In particular, a hardware probe may include hardware that includes functionality to monitor inline data transmissions, such as data sent between endpoints communicating over network paths or data sent between network elements as shown in hardware probe E (105). For example, hardware probe D (104) may perform a packet analysis on network data (162) that is transmitted by user device B (112) to server Y (114) to determine one or more security vulnerabilities or noncompliance with one or more security protocols. Thus, various hardware probes may collect network information regarding security control implementations, security protocols, and other types of security information directly from network traffic. Hardware probes may further transmit such network information (e.g., network information D (165)) to a cybersecurity activity assessment manager for further analysis.

In some embodiments, for example, the cybersecurity activity assessment manager Z (150) includes functionality for receiving information from both a configuration management database (CMDB) (192), containing configuration information regarding all network elements including, at least, date of commission, date of decommission, owner contact, network zone, and a data repository (193), containing information about the activity of the network elements. As such, a hardware probe may include hardware that performs a packet analysis to identify and categorize inbound and outbound running applications by monitoring network traffic. Thus, hardware probes determine a presence and/or violation of one or more security metrics through a packet analysis. In some embodiments, for example, a hardware probe detects any activity within a network element and transmits the information regarding the activity and the network element to the data repository (193). Thus, hardware probes may identify devices within a network and their respective cybersecurity risks based on analyzing network traffic.

In some embodiments, a network (e.g., network A (100)) includes one or more software probes. For example, a software probe may be software installed on a network element (e.g., software probe X (123), software probe B (122) on user device B (112), software probe Y (124)) for monitoring potential security vulnerabilities associated with the network element. For example, a software probe may include functionality to identify various configuration settings (e.g., configuration settings B (132), configuration settings X (133), configuration settings Y (134)), such as security controls, network communication settings, and/or various security protocols performed using the network element. In some embodiments, a software probe may compare configuration settings to one or more predetermined security policies, security controls, and/or baselines to identify compliance issues and other security vulnerabilities.

In some embodiments, a network (network A (100)) includes IP scanner (194) that detects all active network elements in a network and maps them to their IP addresses. The IP scanner (194) transmits a signal to every network element and waits to receive a potential response to determine the status of the network element. Each network element is assigned a unique IP configuration to be able to connect and communicate in the network. The responding network elements are considered active and non-responding network elements are considered inactive. In some embodiments, the results of IP scanner (194) may be compared to the CMDB (192) and devices registered by IP scanner (194) and not by CMDB (192) may be added or dropped.

Further, the range of the IP scanner (194) may be determined to scan only predetermined groups of network elements in a periodical manner. The IP scanner (194) provides comprehensive insights into the networking aspects of the network element, such as network interface card type, reservation status, switch port, asset details, or last scan time, physical location or the system name of the network element currently using the network. Additionally, periodic scanning of the network using automated IP scanner schedules is an effective way to monitor network resources and ensures the accuracy of the network elements.

Returning to the cybersecurity activity assessment manager, the cybersecurity activity assessment manager Z (150) may include hardware and/or software that includes functionality for collecting cybersecurity data (e.g., cybersecurity data (153)) over a network using various hardware probes and software probes. In some embodiments, the cybersecurity activity assessment manager obtains cybersecurity data by interfacing and extracting information from other management systems in a network or among an organization's infrastructure. In particular, the cybersecurity activity assessment manager Z (150) may request information from a Data Repository (193), a network management system (e.g., network management system Y (191)) and/or the CMDB (192). In some embodiments, the cybersecurity activity assessment manager Z (150) is implemented in a cloud computing environment by a cloud server, where the cloud server may obtain the data from various probes over various internet connections. Where cybersecurity data may be generated by a cybersecurity activity assessment manager, in some embodiments, hardware probes and/or software probes may directly generate the cybersecurity data.

In some embodiments, the cybersecurity activity assessment manager Z (150) obtains user inputs from one or more user devices regarding activity of the network device, network interface card type, reservation status, switch port, asset details, or last scan time, physical location or the system name of the network element currently using the network. In some embodiments, a cybersecurity activity assessment manager includes hardware and/or software such as an algorithm engine (152) for analyzing data received from the network management system (191), CMDB (192), the Data Repository (193), and the IP scanner (194). For example, the algorithm engine may analyze the received cybersecurity data to verify the newly commissioned network elements, the recently removed decommissioned network elements, and to assess the activity and availability of the network elements. This activity and availability assessment of the network elements may be based on one or more templates corresponding to a security standard or framework.

In some embodiments, the cybersecurity activity assessment manager Z (150) includes functionality for transmitting one or more remediation commands (e.g., remediation command (163)) based on one or more activity and availability assessment of the network elements. In particular, a remediation command may be a network message that causes one or more remediation procedures to be performed automatically by a network element. Examples of remediation procedures include one or more of the following: adding missing devices to the date repository (193); removing decommissioned devices from the data repository (193); performing connection tests to validate availability of the network element; changing configuration settings on a network element; removing a network connection; or adjusting a predetermined workflow or rule associated with a network protocol. In some embodiments, the cybersecurity activity assessment manager Z (150) includes a remediation queue that organizes the sequence that remediation procedures are implemented in a network.

In some embodiments, the cybersecurity activity assessment manager Z (150) includes hardware and/or software that provides a user interface (e.g., user interface Z (151)) to various user devices over a network or in a cloud computing environment. In particular, the user interface may provide parties with the capability to review the activity and availability assessment regarding network elements or an organization as a whole. Likewise, a user interface may receive inputs from a user, such as cybersecurity analysts, regarding cybersecurity risks and security protocols. In some embodiments, for example, a cybersecurity activity assessment manager may include software to provide a graphical user interface for presenting data and/or receiving commands to initiate remediation actions with a network.

Keeping with FIG. 1, the cybersecurity activity assessment manager Z (150) may include functionality for generating one or more assessment reports (e.g., assessment report M (161), assessment reports (154)) based on cybersecurity data. In particular, an assessment report may include the active network elements, the commissioned network elements, the decommissioned network elements, the inactive network elements, and alert the administrator to investigate and fix the issue. In some embodiments, an assessment report includes changes in the network with respect to a particular measurements from a previous report.

Furthermore, an assessment report may indicate changes with respect to an overall cybersecurity assessment for a network or organization. Reports may also include updates regarding performance of current remediation procedures. Likewise, a cybersecurity activity assessment manager may store previous assessment reports (e.g., assessment reports (154) in a database, such as to compare and identify overall performance improvements at periodic intervals. Such assessment reports may be provided to user devices through a dashboard integration to a cybersecurity activity assessment manager's user interface.

In some embodiments, a network element may host a software probe to inspect a configuration of this network element. Alternatively, the configuration might be extracted from a CMDB operating on a network that includes the network element.

Figure 2:
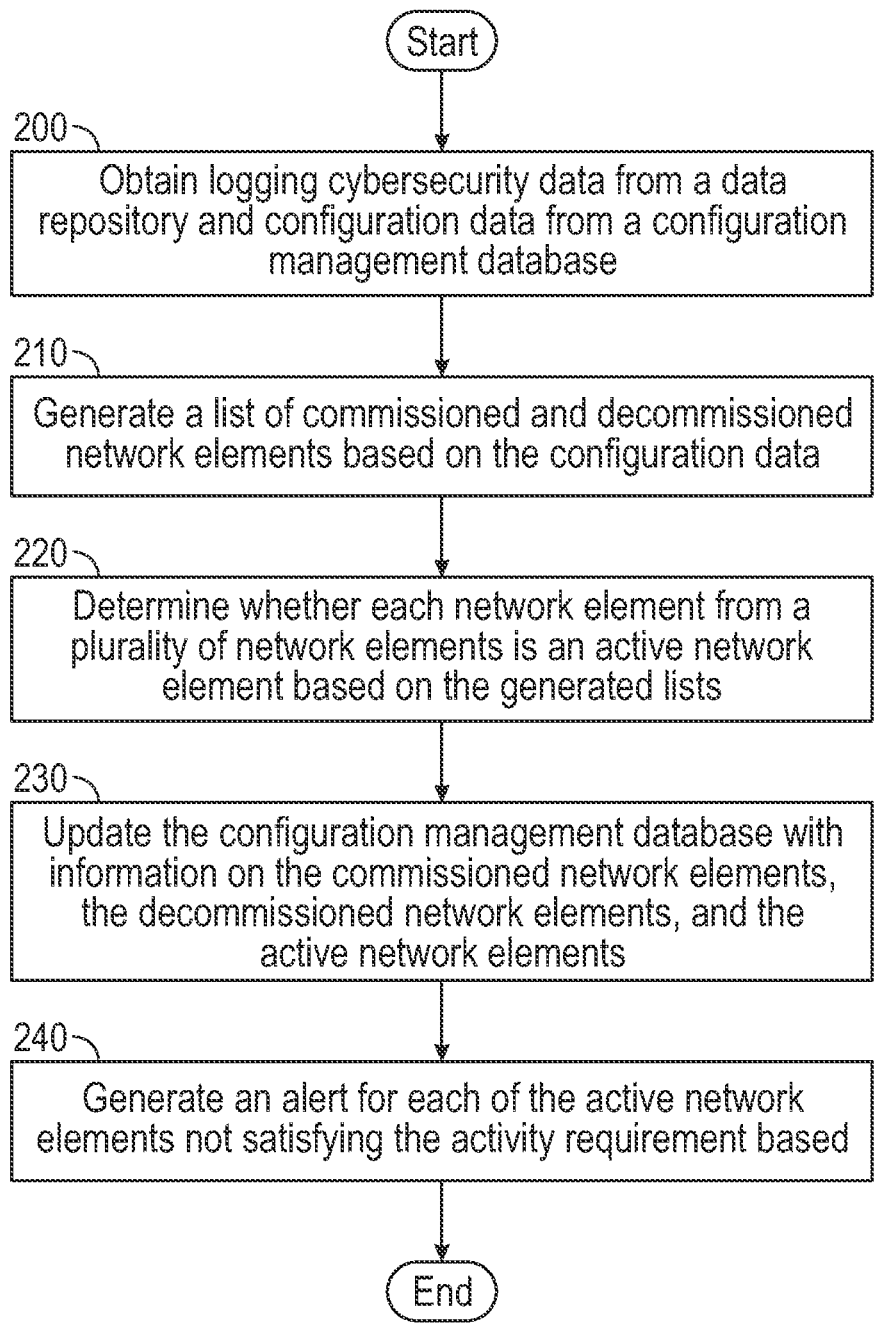
FIG. 2 shows a flowchart in accordance with one or more embodiments.

Turning to FIG. 2, FIG. 2 shows a flowchart in accordance with one or more embodiments. Specifically, FIG. 2 describes a general method for assurance and monitoring of continuous active data. One or more blocks in FIG. 2 may be performed by one or more components (e.g., cybersecurity activity assessment manager (150)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, one or more cybersecurity data and configuration data are obtained in accordance with one or more embodiments. The cybersecurity data is stored in data repository (193) and includes activity of the network device, network interface card type, reservation status, switch port, asset details, or last scan time, physical location or the system name of the network element currently using the network. The cybersecurity data is periodically collected by hardware and software probes. Configuration data is stored in CMDB (192) and includes, at least, date of commission, date of decommission, owner contact, network zone.

In Block 210, the algorithm engine (152) analyzes the configuration data stored in CMDB (192). More specifically, the algorithm engine (152), initially, adds all commissioned network elements to a list. Further, the algorithm engine (152) drops all decommissioned network elements from a list, creating a list of all active network elements. This process may be performed periodically, or it can be performed after every reported addition or removal of the network element in a network.

Figure 3A:
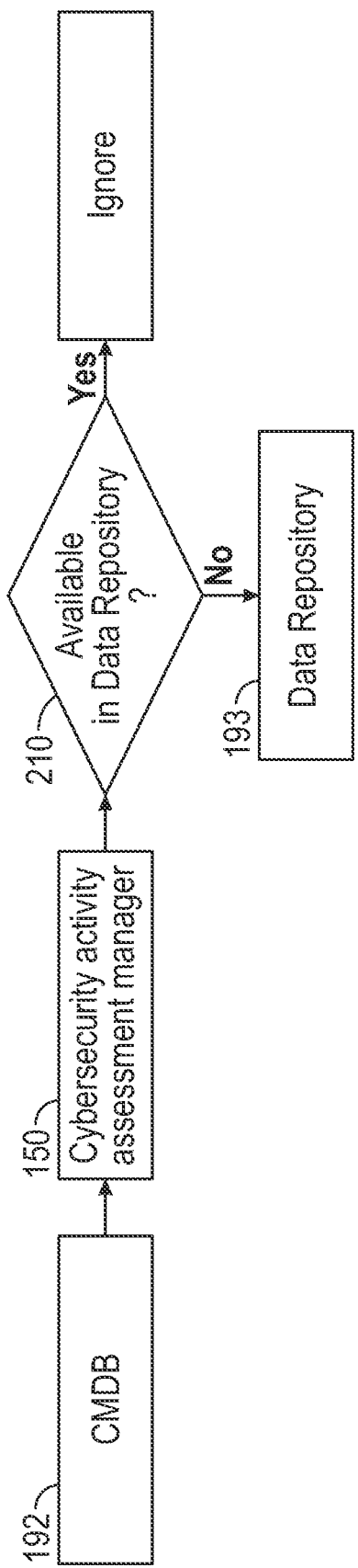
FIGS. 3A and 3B shows an example in accordance with one or more embodiments.

In Block 220, the algorithm engine (152) analyzes the configuration data stored in CMDB (192) and the cybersecurity data stored in the data repository (193) to determine the active network elements. As shown in FIG. 3A, the cybersecurity activity assessment manager (150) periodically checks all available network elements in the CMDB (192). The available network element is a network element that was commissioned and not decommissioned. The list of all available network elements is compared to the cybersecurity data in data repository (193). Based on the difference between the list of available network elements from the CMDB (192) and the cybersecurity data from the data repository (193), the missing network devices are added to the data repository (193). However, if there is no difference between list of available network elements from the CMDB (192) and the cybersecurity data from the data repository (193) the process is dropped and ignored until the next cycle.

Figure 3B:
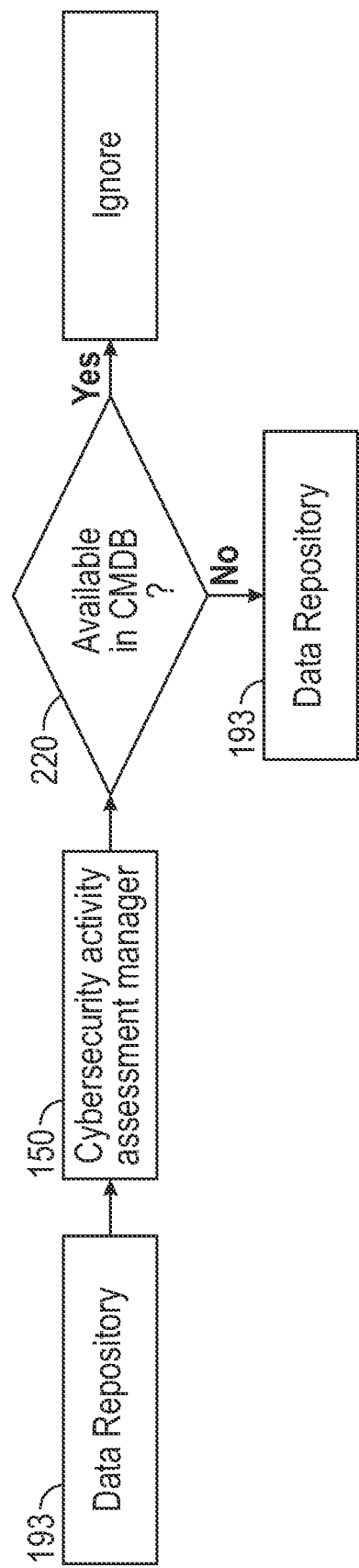

Additionally, as shown in FIG. 3B, the cybersecurity activity assessment manager (150) periodically checks cybersecurity data in the data repository (193). The list of all available network elements is compared to the cybersecurity data in CMDB (192). Based on the difference between the list of the cybersecurity data from the data repository (193) and the list of available network elements from the CMDB (192), the decommissioned network devices are removed from the data repository (193). However, if there is no difference between list of available network elements from the CMDB (192) and the list of the cybersecurity data from the data repository (193) the process is dropped and ignored until the next cycle. The network elements that remain on the list after commission and decommission process are considered active network elements. In Block 230, the CMDB (192) is updated with the information regarding the commissioned network elements, decommissioned network elements, and the active network elements.

In Block 240, an alert is generated for each of the active network elements not satisfying the activity requirement in accordance with one or more embodiments. The alert is generated for the network elements that stop sending data to the data repository (193) in a given time interval. To avoid a high rates of false positive data, where active network devices that rarely send a signal to the data repository (193) are categorized as inactive, the network devices are categorized based on the frequency of transmitting the signal to the date repository (193). As such, this method allows different requirements for different network devices based on the frequency of transmitting the signal to the date repository (193).

In one or more embodiments, the network devices that send signal every second are marked as hot. If the hot network device does not send a signal in a time interval longer than a second, such as a minute, an alert will be generated to inform the administrator to investigate and fix the issue. If a device is historically not transmitting signal every second, the cybersecurity activity assessment manager (150) increments the monitoring time interval to one hour and marks the device as warm. Additional monitoring time intervals are medium, with a duration of 1 to 3 days, low, with duration of 1 week. Each device is categorized to prevent network devices of different transmission frequencies to be assessed on the same metrics, which would defeat the alerting purpose for pursuing the missed events or data. Also, this method will ease the administration and troubleshooting overhead will reduce the time for investigation.

Further, in one or more embodiments, one or more remediation commands may transmitted together with the alert. In some embodiments, a cybersecurity activity assessment manager may perform remediation monitoring and/or remediation procedures over a network. More specifically, a cybersecurity activity assessment manager may track implementation of various remediation procedures, e.g., with a remediation queue, and determine the status of implementing a particular remediation procedure. For example, a cybersecurity activity assessment manager may schedule different remediation procedures for different times and in a predetermined sequence. This schedule may be controlled and/or adjusted using remediation commands, for example. In some embodiments, a remediation command is similar to the remediation commands described above in FIG. 1 and the accompanying description.

Accordingly, a network element may transmit remediation data to the cybersecurity activity assessment manager. For example, remediation data may provide a status update regarding one or more remediation procedures being performed on the network element. Thus, in some embodiments, a remediation procedure is performed autonomously using a cybersecurity activity assessment manager. A cybersecurity activity assessment manager may further update a cybersecurity assessment of a network or network element without conducting a full assessment again based completion of the remediation procedure. The cybersecurity activity assessment manager may also conduct incremental assessment as required for specific control standards identified as a gap during the full assessment.

Figure 4:
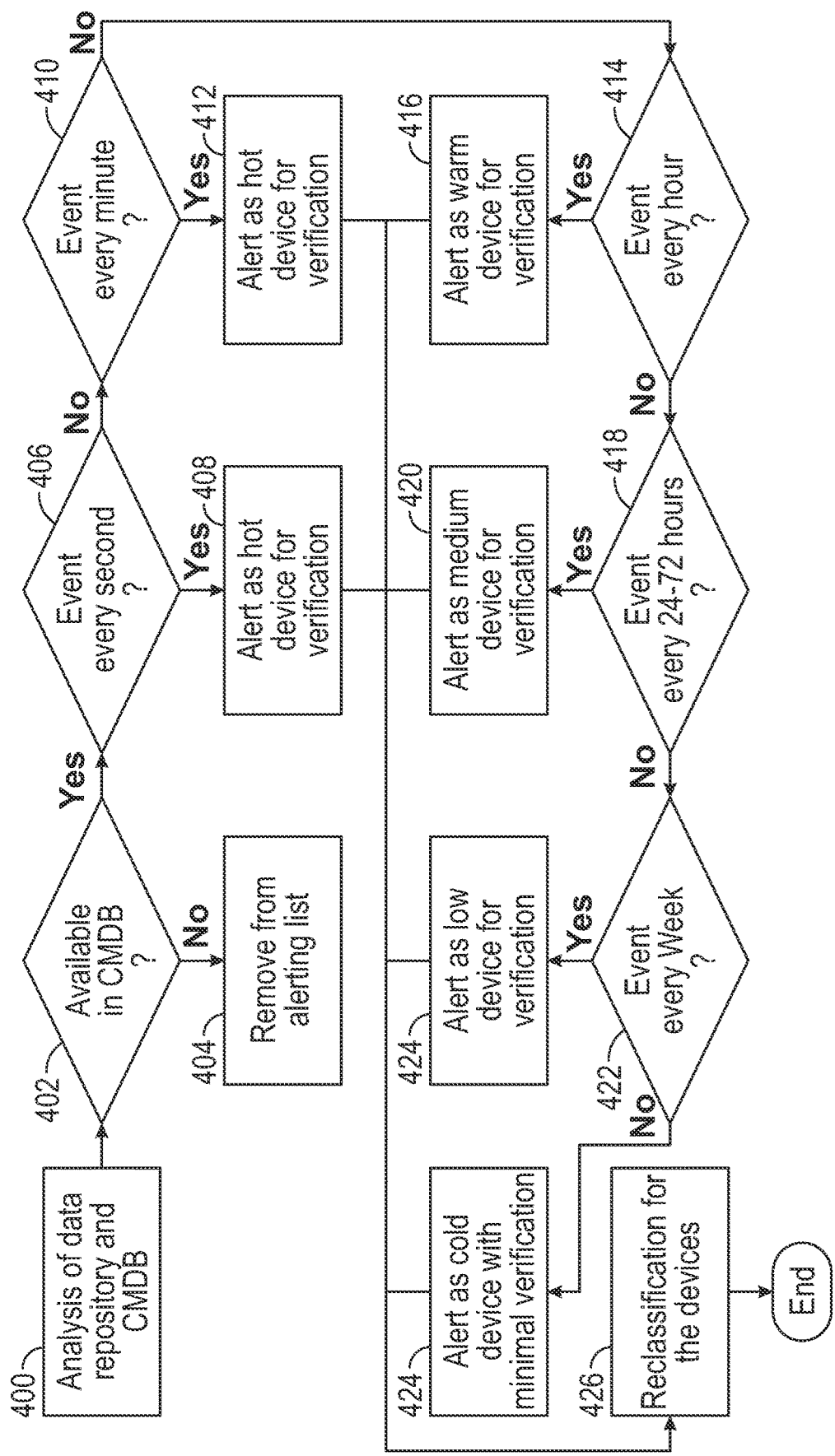
FIG. 4 shows a flowchart in accordance with one or more embodiments.

Turning to FIG. 4, FIG. 4 shows a flowchart in accordance with one or more embodiments. Specifically, FIG. 4 describes a specific method for determining the categorization for network devices. One or more blocks in FIG. 4 may be performed by one or more components (e.g., cybersecurity activity assessment manager (150)) as described in FIG. 1. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Blocks 400 and 402, the data repository (193) and CMDB (192) are analyzed in accordance with one or more embodiments and a determination is made whether the network element is available CMDB (192). As described in FIG. 3A the cybersecurity activity assessment manager (150) periodically checks all available network elements in the CMDB (192) The list of all available network elements is compared to the cybersecurity data in data repository (193). Based on the difference between the list of available network elements from the CMDB (192) and the cybersecurity data from the data repository (193), the missing network devices are added to the data repository (193). As such, a list of all commissioned network elements is generated.

In Block 402, the list of all available network elements is compared to the cybersecurity data in CMDB (192). Based on the difference between the list of the cybersecurity data from the data repository (193) and the list of available network elements from the CMDB (192), in Block 404 the network devices not available in the CMDB (192) are removed from the data repository (193). The network elements that remain on the list after commission and decommission process are considered active network elements.

In Blocks 406, 410, 414, 418, and 422 a determination is made whether the signaling event occurs in a predetermined time interval. Specifically, the predetermined time intervals are set to durations of one second, one minute, one hour, one to three days, and week and longer, respectively. The process of determining the category of a network device is iterative. The verification starts from the smallest time interval and checks if the network element sends the signal regularly in that frequency. If the network element does not send regular signal in the given frequency, then that network element is compared against the next time interval, until the transmission frequency of a network element corresponds to a given time interval.

In Blocks 408, 412, 416, 420, and 424 the network devices are categorized based on their activity frequency. Specifically, the network devices that are active multiple times in one hour are categorized as hot, the network devices that are active every hour are categorized as warm, the network devices that are active in a time interval of 1 day to 3 days are categorized as medium, the network devices that are active every week are categorized as low, and the network devices that are active every week are categorized as cold. The network devices may be reclassified. The reclassification is triggered when the network device changes the pattern of its activity frequency. The reclassification may be performed continuously or in predetermined cycles. For example, in one or more embodiments, reclassification may be done continuously when the device pattern changes (e.g., the frequency of forwarding events might change from/to second, minute, hour, etc.). As a result, the device needs to be reclassified and assigned the new classification: low, cold, medium, etc.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 5:
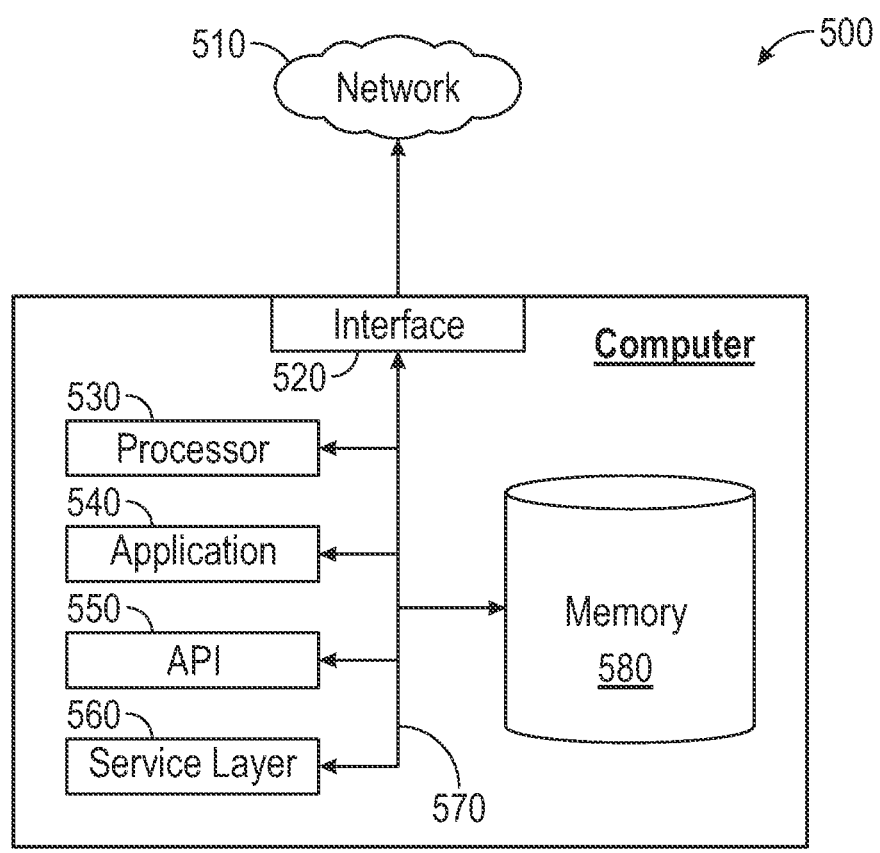
FIG. 5 shows a computing system in accordance with one or more embodiments.

Embodiments may be implemented on any suitable computing device, such as the computer system shown in FIG. 5. Specifically, FIG. 5 is a block diagram of a computer system (500) used to provide computational functionalities associated with described algorithms, methods, functions, processes, flows, and procedures as described in the instant disclosure, according to an implementation. The illustrated computer (500) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (500) may include a computer that includes an input device, such as a keypad, keyboard, touch screen, or other device that can accept user information, and an output device that conveys information associated with the operation of the computer (500), including digital data, visual, or audio information (or a combination of information), or a GUI.

The computer (500) can serve in a role as a client, network component, a server, a database or other persistency, or any other component (or a combination of roles) of a computer system for performing the subject matter described in the instant disclosure. The illustrated computer (500) is communicably coupled with a network (510). In some implementations, one or more components of the computer (500) may be configured to operate within environments, including cloud-computing-based, local, global, or other environment (or a combination of environments).

At a high level, the computer (500) is an electronic computing device operable to receive, transmit, process, store, or manage data and information associated with the described subject matter. According to some implementations, the computer (500) may also include or be communicably coupled with an application server, e-mail server, web server, caching server, streaming data server, business intelligence (BI) server, or other server (or a combination of servers).

The computer (500) can receive requests over network (510) from a client application (for example, executing on another computer (500) and responding to the received requests by processing the said requests in an appropriate software application. In addition, requests may also be sent to the computer (500) from internal users (for example, from a command console or by other appropriate access method), external or third-parties, other automated applications, as well as any other appropriate entities, individuals, systems, or computers.

Each of the components of the computer (500) can communicate using a system bus (570). In some implementations, any or all of the components of the computer (500), both hardware or software (or a combination of hardware and software), may interface with each other or the interface (520) (or a combination of both) over the system bus (570) using an application programming interface (API) (550) or a service layer (560) (or a combination of the API (550) and service layer (560). The API (550) may include specifications for routines, data structures, and object classes. The API (550) may be either computer-language independent or dependent and refer to a complete interface, a single function, or even a set of APIs. The service layer (560) provides software services to the computer (500) or other components (whether or not illustrated) that are communicably coupled to the computer (500). The functionality of the computer (500) may be accessible for all service consumers using this service layer. Software services, such as those provided by the service layer (560), provide reusable, defined business functionalities through a defined interface. For example, the interface may be software written in JAVA, C++, or other suitable language providing data in extensible markup language (XML) format or other suitable format. While illustrated as an integrated component of the computer (500), alternative implementations may illustrate the API (550) or the service layer (560) as stand-alone components in relation to other components of the computer (500) or other components (whether or not illustrated) that are communicably coupled to the computer (500). Moreover, any or all parts of the API (550) or the service layer (560) may be implemented as child or sub-modules of another software module, enterprise application, or hardware module without departing from the scope of this disclosure.

The computer (500) includes an interface (520). Although illustrated as a single interface (520) in FIG. 5, two or more interfaces (520) may be used according to particular needs, desires, or particular implementations of the computer (500). The interface (520) is used by the computer (500) for communicating with other systems in a distributed environment that are connected to the network (510). Generally, the interface (520 includes logic encoded in software or hardware (or a combination of software and hardware) and operable to communicate with the network (510). More specifically, the interface (520) may include software supporting one or more communication protocols associated with communications such that the network (510) or interface's hardware is operable to communicate physical signals within and outside of the illustrated computer (500).

The computer (500) includes at least one computer processor (530). Although illustrated as a single computer processor (530) in FIG. 5, two or more processors may be used according to particular needs, desires, or particular implementations of the computer (500). Generally, the computer processor (530) executes instructions and manipulates data to perform the operations of the computer (500) and any algorithms, methods, functions, processes, flows, and procedures as described in the instant disclosure.

The computer (500) also includes a memory (580) that holds data for the computer (500) or other components (or a combination of both) that can be connected to the network (510). For example, memory (580) can be a database storing data consistent with this disclosure. Although illustrated as a single memory (580) in FIG. 5, two or more memories may be used according to particular needs, desires, or particular implementations of the computer (500) and the described functionality. While memory (580) is illustrated as an integral component of the computer (500), in alternative implementations, memory (580) can be external to the computer (500).

The application (540) is an algorithmic software engine providing functionality according to particular needs, desires, or particular implementations of the computer (500), particularly with respect to functionality described in this disclosure. For example, application (540) can serve as one or more components, modules, applications, etc. Further, although illustrated as a single application (540), the application (540) may be implemented as multiple applications (540) on the computer (500). In addition, although illustrated as integral to the computer (500), in alternative implementations, the application (540) can be external to the computer (500).

There may be any number of computers (500) associated with, or external to, a computer system containing computer (500), each computer (500) communicating over network (510). Further, the term "client," "user," and other appropriate terminology may be used interchangeably as appropriate without departing from the scope of this disclosure.

Moreover, this disclosure contemplates that many users may use one computer (500), or that one user may use multiple computers (500).

In some embodiments, the computer (500) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method, comprising:
   obtaining cybersecurity data from a data repository and configuration data from a configuration management database;
   generating, by a computer processor, a list of a plurality of commissioned network elements and a plurality of decommissioned network elements based on the configuration data;
   determining, by the computer processor, whether each network element from a plurality of network elements is an active network element based on the generated lists;
   updating, by the computer processor and based on the determination, the configuration management database with information on the plurality of the commissioned network elements, information on the plurality of the decommissioned network elements, and information on a plurality of active network elements;
   determining, by the computer processor, whether each of the plurality of the active network elements satisfies an activity requirement of its activity group based on the activity of the plurality of the active network elements; and
   generating, by the computer processor, an alert for each of the plurality of the active network elements not satisfying the activity requirement based on the activity of the plurality of the active network elements.

2. The method of claim 1, further comprising:
   determining, by the computer processor, whether each of the plurality of the active network elements is active or passive; and
   generating, by the computer processor, a visual report comprising a plurality of alerts for each of the plurality of the active network elements not satisfying the activity requirement;
   transmitting, by the computer processor, the visual report to a system administrator.

3. The method of claim 1,
   wherein the data repository stores the cybersecurity data of the activity of the plurality of the active network elements, and
   wherein the configuration management database stores the information on the plurality of the active network elements and the information on the plurality of the decommissioned network elements.

4. The method of claim 1, wherein the cybersecurity data is obtained using an internet protocol (IP) scanner.

5. The method of claim 1, wherein the active network element is a network element in a network that is not decommissioned.

6. The method of claim 1, wherein the information on the plurality of the active network elements includes a time of a last activity time of the active network element, a name of the active network element, and a location of the active network element, data of an owner, and a network zone.

7. The method of claim 1, wherein the determination whether each network element from the plurality of network elements is the active network element is based on an algorithm engine.

8. The method of claim 1, wherein the activity requirement is a time interval in which the data of each active network element is periodically obtained and transmitted to the data repository.

9. The method of claim 8, wherein the activity group includes the plurality of the active network elements with same activity requirement.

10. The method of claim 1, wherein the alert, for each of the plurality of the active network elements not satisfying the activity requirement, triggers a connection test for verification of functionality of the plurality of the active network elements not satisfying the activity requirement.

11. A system, comprising:
    a network comprising a plurality of network elements;
    a hardware probe coupled to the plurality of network elements;
    a network element coupled to the plurality of network elements, the network element comprising a software probe; and
    a computer processor, wherein the computer processor is coupled to the hardware probe, the software probe, and the plurality of network elements, and wherein the computer processor comprises functionality for:
      obtaining cybersecurity data from a data repository and configuration data from a configuration management database;
      generating a list of a plurality of commissioned network elements and a plurality of decommissioned network elements based on the configuration data;
      determining whether each network element from the plurality of network elements is an active network element based on the generated lists;
      updating, based on the determination, the configuration management database with information on the plurality of the commissioned network elements, information on the plurality of the decommissioned network elements, and information on a plurality of active network elements;

determining whether each of the plurality of the active network elements satisfies an activity requirement of its activity group based on the activity of the plurality of the active network elements; and generating an alert for each of the plurality of the active network elements not satisfying the activity requirement based on the activity of the plurality of the active network elements.

12. The system of claim 11, wherein the computer processor further comprises functionality for:

determining whether each of the plurality of the active network elements is active or passive; and generating a visual report comprising a plurality of alerts for each of the plurality of the active network elements not satisfying the activity requirement;

transmitting the visual report to a system administrator.

13. The system of claim 11, wherein the data repository stores the cybersecurity data of the activity of the plurality of the active network elements, and wherein the configuration management database stores the information on the plurality of the active network elements and the information on the plurality of the decommissioned network elements.

14. The system of claim 11, wherein the cybersecurity data is obtained using an internet protocol (IP) scanner.

15. The system of claim 11, wherein the active network element is the network element in a network that is not decommissioned.

16. A non-transitory computer readable medium storing instructions executable by a computer processor, the instructions comprising functionality for:

obtaining cybersecurity data from a data repository and configuration data from a configuration management database;

generating a list of a plurality of commissioned network elements and a plurality of decommissioned network elements based on the configuration data;

determining whether each network element from a plurality of network elements is an active network element based on the generated lists;

updating, based on the determination, the configuration management database with information on the plurality of the commissioned network elements, information on the plurality of the decommissioned network elements, and information on a plurality of active network elements;

determining whether each of the plurality of the active network elements satisfies an activity requirement of its activity group based on the activity of the plurality of the active network elements; and generating an alert for each of the plurality of the active network elements not satisfying the activity requirement based on the activity of the plurality of the active network elements.

17. The non-transitory computer readable medium of claim 16, wherein the instructions further comprise functionality for:

determining whether each of the plurality of the active network elements is active or passive; and generating a visual report comprising a plurality of alerts for each of the plurality of the active network elements not satisfying the activity requirement;

transmitting the visual report to a system administrator.

18. The non-transitory computer readable medium of claim 16, wherein the data repository stores the cybersecurity data of the activity of the plurality of the active network elements, and wherein the configuration management database stores the information on the plurality of the active network elements and the information on the plurality of the decommissioned network elements.

19. The non-transitory computer readable medium of claim 16, wherein the cybersecurity data is obtained using an internet protocol (IP) scanner.

20. The non-transitory computer readable medium of claim 16, wherein the active network element is the network element in a network that is not decommissioned.

* * * * *